[19] United States Patent
Stolfo

[11] 4,398,954
[45] Aug. 16, 1983

[54] MICROCAPSULAR COATING COMPOSITION CONTAINING A HYDROPHOBIC SILICA

[75] Inventor: John J. Stolfo, Chillicothe, Ohio

[73] Assignee: The Mead Corporation, Dayton, Ohio

[21] Appl. No.: 195,910

[22] Filed: Oct. 10, 1980

Related U.S. Application Data

[62] Division of Ser. No. 108,909, Dec. 31, 1979, Pat. No. 4,268,069.

[51] Int. Cl.[3] ........................ C09D 11/00; B01J 13/02
[52] U.S. Cl. ..................................... 106/21; 282/27.5; 428/320.6; 428/914; 428/402.2
[58] Field of Search .......................... 252/316; 106/21; 428/320.6, 914

[56] References Cited

U.S. PATENT DOCUMENTS

| | | | |
|---|---|---|---|
| 3,076,768 | 2/1963 | Boylan | 252/321 X |
| 3,523,906 | 8/1970 | Vrancken et al. | 252/316 |
| 3,996,061 | 12/1976 | Johnson | 252/316 X |
| 4,087,376 | 5/1978 | Foris et al. | 252/316 |
| 4,154,462 | 5/1979 | Golden et al. | 282/27.5 |
| 4,191,587 | 3/1980 | Kratel et al. | 428/405 X |

*Primary Examiner*—Richard D. Lovering
*Attorney, Agent, or Firm*—Arnold, White & Durkee

[57] ABSTRACT

A novel coating composition is disclosed comprising oil-containing microcapsules dispersed in an aqueous continuous phase, which phase also contains finely divided silica particles and a binder for said microcapsules and said silica particles. The silica particles have been treated with an organic material such as an organic silicon compound to give the particles a hydrophobic surface. The coating composition has utility in the manufacture of paper coated with microcapsules. Such paper is characterized by a substantial reduction of specking when used in photocopying apparatus which utilizes a pressure nip to assist transfer of a powder image from a photoreceptor belt to the paper.

In a preferred form, the oil contains a color precursor of the electron donating type and the aqueous composition contains stilt material such as starch particles. The coating composition is applied to paper to form a transfer coating on copy paper, said copy paper having utility in the production of multi-part forms.

10 Claims, No Drawings

MICROCAPSULAR COATING COMPOSITION CONTAINING A HYDROPHOBIC SILICA

This application is a divisional application of U.S. Ser. No. 108,909 filed Dec. 31, 1979 which has now matured into U.S. Pat. No. 4,268,069 and which issued on May 19, 1981.

BACKGROUND OF THE INVENTION

1. Field of the Invention

This invention relates to the production of novel microcapsular coating compositions containing finely divided silica particles having a hydrophobic surface and to microcapsule coated papers made therefrom.

A preferred use of the microcapsular coating composition is in the production of pressure-sensitive carbonless copy papers having a transfer coating applied to one surface fo use in multi-part forms. The invention will be described hereinafter in relation to the production of such copy papers.

2. Prior Art

Pressure-sensitive carbonless copy paper, briefly stated, is a standard type of paper wherein during manufacture the backside of a paper substrate is coated with what is referred to as CB or transfer coating, the CB coating containing a solution of one or more color precursors, generally an oil solution, in microencapsulated form. At the same time, the front side of the paper substrate is coated during manufacture with what is referred to as a CF or receptor coating which contains one or more color developers. Both the solution of color precursor and the color developer remain in the coating compositions on the respective back and front surfaces of the paper in colorless form. This is true until the CB and CF coatings are brought into abutting relationship and sufficient pressure, as by a typewriter, is applied to rupture the CB coating to release the solution of color precursor. At this time the color precursor solution transfers to the CF coating and reacts with the color developer therein to form an image. Patents relating to conventional methods of preparing carbonless paper products and to the preparation CF and CB coating composition are:

U.S. Pat. No. 2,712,507 (1955) to Green.
U.S. Pat. No. 2,730,456 (1956) to Green et al.
U.S. Pat. No. 3,455,721 (1969) to Phillips et al.
U.S. Pat. No. 3,466,184 (1969) to Bowler et al.
U.S. Pat. No. 3,672,935 (1972) to Miller et al.

Manifold forms utilizing pressure-sensitive carbonless copy papers have been in common use commercially for several years. Such copy papers are adaptable to the production of multi-part forms and have in many instances replaced the older forms utilizing carbon paper. Printing or production of the carbonless forms by photocopying has been done prior to the application of the CB or CF coatings. However, conventionally it has been desirable to print the form over the CF coating subsequent to the application of one or both of the CB or CF coatings. The CB side is normally not printed. This is especially true when it is desirable to produce the form by photocopying after the paper has been cut into sheets.

One such photocopying operation has been done on sheet fed Xerox 9200 or Xerox 9400 copiers. Both of these copiers utilize a pressure nip between a photoreceptor belt and a transfer roll to assist transfer of the xerographic developer image from a photoreceptor belt on which the developer image was formed to a sheet of paper. If, as in conventional practice, the sheet has been previously coated with microcapsules, the coated paper may contain small amounts of unencapsulated oil as may be produced by inadvertent rupture of the microcapsules. The unencapsulated oil transfers to the transfer roll with which it is in contact. The oil accumulates toner, stilt materials, paper dust and fibers and finally this accumulation transfers to the photoreceptor belt where it causes a "speck" to appear repetitively on subsequently imaged sheets. The appearance of such specks on a form is objectionable.

In addition to the patents cited supra which disclose conventional preparation of transfer (CB) coatings and receptor (CF) coatings, a number of other patents disclose the use of absorbent pigments in combination with a releasable oil as follows:

U.S. Pat. No. 2,929,736 (1960) to Miller
U.S. Pat. No. 2,980,941 (1961) to Miller
U.S. Pat. No. 3,481,759 (1969) to Ostlie
U.S. Pat. No. 3,776,864 (1973) to Woerner
U.S. Pat. No. 4,089,547 (1978) to Brynko et al.
U.S. Pat. No. 4,154,462 (1979) to Golden et al.

U.S. Pat. No. 2,929,736 is illustrative of a number of self-contained copying sheets wherein a coating containing an oil solution of a color precursor in microcapsules and isolated therefrom a reactive pigment; i.e., clay, is applied to a paper base. U.S. Pat. No. 2,980,941 discloses a microcapsular coating containing oil in the microcapsules and Fuller's earth particles. U.S. Pat. No. 3,481,759 discloses a transfer paper wherein the microcapsules in the transfer (CB) coating contain a dye precursor and the coating contains a powdered coreactant which reacts with the dye precursor from inadvertently ruptured microcapsules to form a colorless dye. U.S. Pat. No. 3,776,864 discloses a transfer ink containing a dye and a filler to prevent the coating from having a greasy surface. U.S. Pat. No. 4,089,547 discloses manifold receptor sheets containing hydrophilic fumed silicon dioxide particles. U.S. Pat. No. 4,154,462 discloses the preparation of transfer sheets having a CB microcapsular coating. The microcapsules contain an oil solution of a dye intermediate, i.e., color precursors, and the coating contains a particulate oil-absorptive material. The oil-absorptive materials are hydrophilic pigment particles of a particle size normally 0.1 to 5 microns and include such pigments as clays, talc or silica. These pigments were added to the coating composition to permit writing on the coated substrate without interference from oil released by ruptured microcapsules.

It is important to note that none of the above cited prior art patents were concerned with the problem of preventing specking during printing of CB coated sheets, a problem which was solved by the use of microcapsular coating compositions containing finely divided hydrophobic silicas. Further to this, none of the above patents suggest the use of hydrophobic treated finely divided silicas as oil absorbers and/or detackifiers.

I have found that by including hydrophobic finely divided silica in the CB coating composition, the tendency for the formation of specks during production of forms by photocopying of papers produced from these coating compositions was substantially reduced. Runs of up to 50,000 copies have been made without the appearance of specks, whereas specking of paper containing no hydrophobic silica usually occurred before the 7,000th copy. The inclusion of finely divided hydrophobic silica by reducing specking improves the appearance of the form and reduces printing press "downtime" for cleanup of the photoreceptor belt and transfer roll.

STATEMENT OF THE INVENTION

A novel coating composition is disclosed comprising oil-containing microcapsules dispersed in an aqueous continuous phase, which phase also contains finely divided silica particles and a binder for said microcapsules and said silica particles. The silica particles have been treated with an organic material such as an organic silicon compound to give the particles a hydrophobic surface. The coating composition has utility in the manufacture of paper coated with microcapsules. Such paper is characterized by a substantial reduction of specking when used in photocopying apparatus which utilizes a pressure nip to assist transfer of a powder image from a photoreceptor belt to the paper.

In a preferred form, the oil contains a color precursor of the electron donating type and the aqueous composition contains stilt material such as starch particles. The coating composition is applied to paper to form a transfer coating on copy paper, said copy paper having utility in the production of multi-part forms.

DESCRIPTION OF THE PREFERRED EMBODIMENT

The coating compositions of this invention are transfer coatings and comprise oil-containing microcapsules dispersed in an aqueous continuous phase, said aqueous continuous solution phase containing a binder and additionally containing finely divided silica particles having a hydrophobic surface.

In a preferred embodiment of the invention, the oil also contains a chromogenic material and the aqueous solution also contains a stilt material such as starch particles and optionally may contain a surface active agent, hereinafter referred to as a surfactant, to assist in dispersing the hydrophobic silica particles. Coating compositions of the preferred embodiment may be applied to a paper substrate and dried to prepare a pressure-sensitive carbonless copy paper having a transfer coating on one side. Copy papers prepared according to this invention are characterized by substantial reduction of specking when used in photocopying apparatus which utilizes a pressure nip between a photoreceptor belt and a transfer roll to transfer a powder image from the photoreceptor belt to the paper.

For purposes of this invention, "chromogenic material" will refer to color precursors, color formers, color developers and the like. The encapsulated chromogenic material is usually an oil solution of one or more color precursors.

The coating compositions of this invention comprise, in addition to an aqueous dispersion of microcapsules and a binder therefor, finely divided silica particles of submicron size. The useful silica particles have a hydrophobic surface having been treated with an organic material which reacts with the hydroxyl groups normally on the silica surface. The result of this reaction is a finely divided silica with a tightly bonded hydrophobic surface. Typical of the organic treating materials are the organic silicon compounds normally used for water repellency. One group of suitable organic silicon compounds are the chloro-alkylsilanes. Examples of these silanes are dimethyl dichlorosilane and trimethyl chlorosilane. The following commercially available hydrophobic silicas are useful in the practice of this invention.

| Trade Name | Supplier & Address | Treating Material | Surface Area by $N_2$ Adsorption |
|---|---|---|---|
| Tullanox[TM] 500 | Tulco, Inc. North Billerica, Mass. | trimethyl chlorosilane | 225m$^2$/gm |
| QUSO[R] WR-50 | PQ Corporation Valley Forge, Pa. | organic/silicon cmpd. | 120m$^2$/gm |
| QUSO[R] WR-82 | PQ Corporation Valley Forge, Pa. | organic/silicon cmpd. | 75m$^2$/gm |
| Aerosil[R] 972 | Degussa Corporation Teterboro, New Jersey | dimethyl dichlorosilane | 120m$^2$/gm |

The use of finely divided silica which has been treated to give it a hydrophobic surface is critical to the production of the coating compositions of this invention. It has been found that silica particles having a normal hydrophobic surface; that is, silica particles not treated with a hydrophobic material, were not found to be effective in reducing specking.

Silicas with the higher surface area (smaller particle size) tend to have the greatest effect on the elimination of specking. Whereas hydrophobic silica particles having a surface area of about 50 m$^2$/gm or more can be used, a surface area of about 100 m$^2$/gm to about 400 m$^2$/gm is preferred.

In addition to the surface area and adsorption characteristics of the particular hydrophobic silica used, the relative effectiveness of the hydrophobic silica in preventing specking is affected by the following:

1. The amount of hydrophobic silica used;
2. The size of the microcapsules used;
3. The particular oil used;
4. The amount and wetting characteristics of any added surfactant; and to a lesser extent
5. The weight of transfer coating applied.

The amount of hydrophobic silica useful in this invention is in the range of about 0.1% to about 10% by weight of the total solids of the coating composition, a range of about 3% to about 7% being preferred. Higher amounts than 10% are uneconomical and have little or no added effect on specking.

The mean size of the microcapsules useful in this invention ranges from about 3 microns up to about 12 microns. A preferred range is about 3 to about 8 microns and the most preferred range is from about 3 to about 6 microns. In the case of microcapsules which tend to aggregate such as gelatin microcapsules, the same ranges apply to the size of the aggregates.

In the process of incorporating the hydrophobic silica into the aqueous coating composition, it is sometimes expedient to add a surfactant to properly disperse the silica particles because of their hydrophobic nature. Although a wide range of wetting or dispersing agents could be used, Aerosol OT-75, supplied by American Cyanamid Co., Industrial Chemicals Div., Wayne, N.J., and Pluronic L-31, supplied by BASF Wyandotte Corporation, Wyandotte, Mich. have been found to be particularly effective. Care must be taken not to use more surfactant than necessary to give a good dispersion as too much of the surfactant will reduce the effectiveness of the hydrophobic silica in the reduction of specking. Amounts of surfactant up to about 0.6% solids by weight based on the total solids in the coating have been found to assist dispersion of the silica without materially affecting the specking. A preferred range is from about 0.1% to about 0.4% surfactant. The silica particles may be separately dispersed in water containing the surfactant prior to the addition of the silica to the coating composition.

A transfer coat weight of about 2 pounds to about 8 pounds per 3300 square feet has been found to be practical. A preferred coat weight is about 2.5 pounds to about 5 pounds and a most preferred range is about 3 pounds to about 4 pounds per 3300 square feet.

In the preferred embodiment of this invention, microencapsulated oil solutions of color precursors are used. The oils useful in the process of this invention are the non-polar oils and solvents. In the preferred use of this invention; i.e., to prepare pressure-sensitive carbonless transfer sheets, the preferred hydrophobic liquids are monoisopropylbiphenyl (MIPB), chlorinated paraffins, alkylnaphthalenes, alkyl phthalates, phenyl alkanes, kerosene, petroleum naphtha, hydrogenated terphenyls and mixtures thereof.

The particular wall-forming materials or the particular encapsulated chromogenic materials are not asserted to be an inventive feature herein. Rather, there are described in the patent literature various capsular chromogenic materials which may be used. The color precursors most useful in the practice of the preferred embodiment of this invention are the color precursors of the electron donating type. The preferred group of electron donating color precursors include lactone phthalides, such as crystal violet lactone, and 3,3-bis-(1'ethyl-2'methylindol-3'-yl) phthalide, the lactone fluorans, such as 2-dibenzylamino-6-diethylaminofluoran and 6-diethylamino-1, 3-dimethylfluoran, the lactone xanthenes, the leucoauramines, the 2-(omega substituted vinylene)-3, 3-disubstituted-3-H-indol and 1,3,3-trialkylindolinospirans. Mixtures of these color precursors can be used if desired. The color precursors are preferably present in such oil solutions in an amount of from about 0.5% to about 20.0% based on the weight of the oil solution, and the most preferred range being from about 2% to about 7%.

Such chromogenic materials have been encapsulated in gelatin wall-forming materials (see U.S. Pat. Nos. 2,730,456 and 2,800,457 to Green et al.) including gum arabic, polyvinyl alcohol, carboxymethylcellulose, resorcinol-formaldehyde wall-formers (see U.S. Pat. No. 3,755,190 to Hart et al.), isocyanate wall-formers (see U.S. Pat. No. 3,914,511 to Vassiliades) isocyanate-polyol wall-formers (see U.S. Pat. No. 3,796,669 to Kiritani et al.) urea-formaldehyde wall-formers (see U.S. Pat. Nos. 4,001,140, 4,087,376 and 4,089,802 to Foris et al.) and hydroxypropylcellulose (see commonly-assigned U.S. Pat. No. 4,025,455 to Shackle) in addition to mixtures of the above. Microencapsulation has been accomplished by a variety of known techniques including coacervation, interfacial polymerization, polymerization of one or more monomers in an oil, various melting, dispersing and cooling methods. Compounds which have been found preferable for use as wall-forming materials in the various microencapsulation techniques include hydroxypropylcellulose, methylcellulose, carboxymethylcellulose, gelatin, urea-formaldehyde, melamine-formaldehyde, polyfunctional isocyanates and prepolymers thereof, polyfunctional acid chlorides, polyamines, polyols, epoxides and mixtures thereof. The most preferred wall-forming materials are hydropropylcellulose and urea-formaldehyde compounds.

In preparing the preferred coating compositions of this invention, the finely divided hydrophobic silica particles are added along with stilt material, an aqueous solution of a binder and optionally a surfactant and mixed into an aqueous dispersion of the desired microcapsules. The microcapsules contain an oil solution of a color precursor mixture. Typically, the stilt material is classified wheat starch particles and the binder is a cooked starch. The order of addition of these materials is not critical to the invention. However, addition of the hydrophobic silica particles and starch particles as aqueous dispersions tend to speed up the mixing process.

The coating composition, so formulated, is applied and dried on a continuous web of paper by any ordinary coating or printing means, such as by roll or blade coating or by gravure or flexographic printing to produce the transfer papers of this invention.

The preferred embodiments of this invention are described in greater detail hereinbelow by reference to the following examples. It should be understood that these examples are given for purposes of illustration only and are not intended by be limitations on the process of this invention. Unless otherwise indicated, all parts, percents and the like are by weight.

EXAMPLE 1

A coating composition was prepared by mixing together the following:

| | Solids |
|---|---|
| Urea-Formaldehyde Microcapsules (37% aqueous dispersion) | 85 parts |
| Starch Particles | 5 parts |
| Cooked Starch (20% aqueous solution) | 5 parts |
| Hydrophobic Silica Particles (Tullanox 500) | 5 parts |
| Surfactant (Aerosil OT-75) | 0.3 parts |

The above urea-formaldehyde microcapsules were prepared using the method generally disclosed in U.S. Pat. No. 4,087,376, except that an ammonium sulfate catalyst was added and the microcapsules contained an oil solution containing color precursors as follows:

| | Parts |
|---|---|
| Monoisopropylbiphenyl | 75.6 parts |
| Deodorized Kerosene | 18.9 parts |
| Crystal Violet Lactone | 3.4 parts |
| 3,3-bis(1'-ethyl-2'methylindol-3-yl)phthalide | 0.40 parts |
| 3-N,N-diethyl-amino-7-(N,N-dibenzylamino)fluoran | 0.85 parts |
| 3-N,N-diethylamino-6,8-dimethylfluoran | 0.85 parts |

The mean size of the microcapsules was approximately 4 microns. The solids of the coating mix was adjusted to about 22%. It was then applied to a paper basestock (46 pounds per 3300 square feet) and was metered to a total coat weight of about 3 (dry) pounds per 3300 square feet using an air knife.

Comparative Example A (Prior Art)

The process of Example 1 was repeated, except that the Tullanox 500 was omitted and 90 parts of urea-formaldehyde capsules were used. The weight of dried coating composition was about the same as in Example 1.

Performance of the paper of Example 1 and Comparative Example A was compared in two test runs at separate times on a Xerox 9200 copier. Operating conditions were known to affect the specking of copy paper. In Test 1, the operating conditions of the copier were selected to give a minimum of specking. Test 2 was selected to give operating conditions selected to give maximum specking. The tests were run as follows:

In Test 1, 7,000 copies of control paper were imaged using a test pattern containing letters, lines and solid print area. After this run, the bias transfer roll (BTR) was examined for spots or specking using (200x) magnification. A substantial number of spots was found. The experimental paper was imaged in the same manner after cleaning the roll. Virtually no spots were found. In this test, no spots were apparent on the photoreceptor belt (PRB) or the copies after running either paper.

In Test 2, the operating conditions of the machine were different than those in Test 1. These conditions would be representative of the conditions that would be found on many commercially used Xerox 9200 machines. After 6,000 copies of control paper, a substantial degree of contamination was found on the bias transfer roll (BTR) and the photoreceptor belt (PRB). A great number of specks were observable on the copies. After cleaning both the bias transfer roll and the photoreceptor belt, 7,000 copies of experimental paper were imaged. A very low level of contamination was found on the bias transfer roll. The photoreceptor belt was clean and no specks were found on the copies.

The results of these tests are given in the following table:

| No. of CB Copies Imaged | Example | Degree of Spotting on BTR | Degree of Spotting on PRB | Degree of Specking on Final Copy |
|---|---|---|---|---|
| | | TEST NO. 1 | | |
| 7,000 | 1-Tullanox 500 | none observed | none observed | none observed |
| 7,000 | A-Control | moderate | none observed | none observed |
| | | TEST NO. 2 | | |
| 7,000 | 1-Tullanox 500 | very low | none observed | none observed |
| 6,000 | A-Control | very high | high | high |

EXAMPLE 2

A coating composition was prepared and coated on a 46 pound paper basestock as in Example 1, except that the Tullanox 500 was replaced by 5 parts of Aerosil R-972, a hydrophobic silica having a surface area of about 120 $m^2$/gm, and the 0.3 parts of surfactant were omitted. The coating weight was 2.5 pounds per 3300 square feet.

EXAMPLE 3

A coating composition was prepared and coated on a 45 pound paper basestock as in Example 1, except that the Tullanox 500 was replaced by 5 parts of QUSO-WR-50, a hydrophobic silica having a surface area of about 120 $m^2$/gm, and 0.5 parts of surfactant OT-75 was added, instead of 0.3 parts of surfactant. The coating weight was 2.6 pounds per 3300 square feet.

EXAMPLE 4

A coating composition was prepared and coated on a 45 pound paper basestock as in Example 1, except that the Tullanox 500 was replaced by 5 parts of QUSO-WR-82, a hydrophobic silica having a surface area of about 75 $m^2$/gm, and the surfactant was omitted. The coating weight was 2.6 pounds per 3300 square feet.

EXAMPLE 5

Example 1 was repeated using urea-formaldehyde microcapsules having a mean size of about 3.1 microns. The coating weight was 2.5 pounds per square feet.

COMPARATIVE EXAMPLE B (PRIOR ART)

A coating composition was prepared and coated on a 45 pound paper basestock as in Example 1, except that the Tullanox 500 was replaced by 5 parts of Alfa Silicon IV oxide, a hydrophilic silica which had not been treated to have a hydrophobic surface having a surface area of about 400 $m^2$/gm, and the surfactant was omitted. The coating weight was 2.5 pounds per 3300 square feet.

Papers produced by Examples 2–5 and Comparative Example B were printed on a Xerox 9200 copier. In each instance, a run of 7,000 copies was made or copying was stopped because of specking of the copies. After 7,000 copies, the bias transfer roll (BTR) was examined under 200x magnification for spots of contamination which eventually transfer to the photoreceptor belt (PRB) and cause specking on the imaged copies. Papers are rated 0–12, depending on the frequency and size of the contaminated spots, with a 0 rating representing no observable spots up to a 12 rating where contaminated spots are frequent and large enough to give incipient specking of the test paper.

A comparison of the performance of papers from Examples 2–5 and Comparative Example B discloses that wherein a hydrophobic silica is used (Examples 2–5) a substantial improvement in resistance to specking is obtained in such papers as compared to papers wherein a hydrophilic silica is usd (Comparative Example B.) The results of the test are given in the following table:

| Paper Example | Trade Name | Type | BTR rating |
|---|---|---|---|
| 2 | Aerosil R-972 | hydrophobic | 3 |
| 3 | QUSO-WR-50 | hydrophobic | 7 |
| 4 | QUSO-WR-82 | hydrophobic | 4 |
| 5 | Tullanox 500 | hydrophobic | 0–1 |
| B | Alfa Silicon IV Oxide | hydrophilic | specking after 6,000 copies |

What is claimed is:

1. A coating composition having utility in the manufacture of coated paper, wherein said coating composition contains microcapsules, said paper being characterized by a substantial reduction of specking when used in photocopying apparatus which utilizes a pressure nip between a photoreceptor belt and a transfer roll to transfer a powder image from the photoreceptor belt to the paper, said coating composition comprising microcapsules containing an oil, said microcapsules being dispersed in an aqueous continuous phase said microcapsules having a mean spherical diameter of from 3 to 12 microns, said aqueous continuous phase further containing an amount of surfactant up to about 0.6% solids by weight based on the total solids and finely divided silica particles and a binder for said microcapsules and said silica particles, said silica particles having been modified by treatment with an organic material whereby the surface of said silica is substantially hydrophobic said treated silica particles having a surface area of 50 $m^2/gm$ or more and being present in said coating composition at a level of from 0.1% to 10.0% by weight based on the total solids of said coating composition.

2. The coating composition of claim 1 wherein said microcapsules contain a chromogenic material in solution in said oil.

3. The coating composition of claim 2 wherein said chromogenic material is a color precursor of the electron donating type.

4. The coating composition of claim 1 wherein said aqueous continuous phase further contains starch particles.

5. The coating composition of claim 1 wherein said organic material is an organic silicon compound.

6. The coating composition of claim 1 wherein said microcapsules have a spherical diameter of about 3 microns to about 8 microns.

7. A coating composition having utility in the manufacture of coated paper, wherein said coating composition contains microcapsules, said paper being characterized by a substantial reduction of specking when used in photocopying apparatus which utilizes a pressure nip between a photoreceptor belt and a transfer roll to transfer a powder image from the photoreceptor belt to the paper, said coating composition comprising microcapsules containing an oil, said oil containing in solution therein a chromogenic material, said chromogenic material being a color precursor of the electron donating type, said microcapsules being dispersed in an aqueous continuous phase said microcapsules having a mean spherical diameter of from 3 to 12 microns, said aqueous continuous phase further containing an amount of surfactant up to about 0.6% solids by weight based on the total solids and finely divided silica particles, stilt material and a binder for said microcapsules, said stilt material and said silica particles, said silica particles having been modified by treatment with an organic material whereby the surface of said silica is substantially hydrophobic said treated silica particles having a surface area of 50 $m^2/gm$ or more and being present in said coating composition at a level of from 0.1% to 10.0% by weight based on the total solids of said coating composition.

8. The coating composition of claim 7 wherein said organic material is an organic silicon compound.

9. The coating composition of claim 7 wherein said microcapsules have a spherical diameter of about 3 microns to about 8 microns.

10. The coating composition of claim 7 wherein said stilt material is starch particles.

* * * * *